US011785595B2

(12) United States Patent
Lohr et al.

(10) Patent No.: US 11,785,595 B2
(45) Date of Patent: Oct. 10, 2023

(54) METHOD AND APPARATUS FOR POWER HEADROOM REPORTING PROCEDURE FOR DIFFERENT SERVING CELLS

(71) Applicant: Motorola Mobility LLC, Chicago, IL (US)

(72) Inventors: Joachim Lohr, Wiesbaden (DE); Prateek Basu Mallick, Langen (DE); Ravi Kuchibhotla, Gurnee, IL (US)

(73) Assignee: Motorola Mobility LLC, Chicago, IL (US)

( * ) Notice: Subject to any disclaimer, the term of this patent is extended or adjusted under 35 U.S.C. 154(b) by 92 days.

(21) Appl. No.: 17/207,549

(22) Filed: Mar. 19, 2021

(65) Prior Publication Data

US 2021/0212092 A1 Jul. 8, 2021

Related U.S. Application Data

(63) Continuation of application No. 16/446,585, filed on Jun. 19, 2019, now Pat. No. 10,980,046, which is a continuation of application No. 15/465,235, filed on Mar. 21, 2017, now Pat. No. 10,375,719.

(51) Int. Cl.
  *H04W 72/1268* (2023.01)
  *H04W 52/36* (2009.01)
  *H04L 5/00* (2006.01)
  *H04W 52/34* (2009.01)
  *H04W 72/23* (2023.01)

(52) U.S. Cl.
  CPC ......... *H04W 72/1268* (2013.01); *H04L 5/001* (2013.01); *H04W 52/34* (2013.01); *H04W 52/365* (2013.01); *H04W 72/23* (2023.01)

(58) Field of Classification Search
  CPC ............ H04W 72/1268; H04W 52/34; H04W 52/365; H04W 72/14; H04L 5/001
  See application file for complete search history.

(56) References Cited

U.S. PATENT DOCUMENTS

| 2016/0037463 | A1* | 2/2016 | Siomina | H04W 52/365 |
| | | | | 370/330 |
| 2018/0132197 | A1* | 5/2018 | Lin | H04W 52/242 |
| 2019/0110255 | A1* | 4/2019 | Haim | H04W 52/243 |
| 2021/0289451 | A1* | 9/2021 | Fu | H04W 72/0446 |

\* cited by examiner

*Primary Examiner* — Chi Ho A Lee
*Assistant Examiner* — Andrew Lee
(74) *Attorney, Agent, or Firm* — Loppnow & Chapa; Matthew C. Loppnow (57) ABSTRACT

An uplink transmission can be received in an allocated slot on a first serving cell of a base station, the allocated slot on the first serving cell overlapping with multiple slots on a second serving cell of the apparatus. A first power headroom report can be received for the allocated slot on the first serving cell. A second power headroom report can be received for the second serving cell, where the second power headroom report is for a first slot of the multiple overlapping slots on the second serving cell that fully overlaps with the allocated slot on the first serving cell. The first power headroom report and the second power headroom report can be received in the uplink transmission in the allocated slot on the first serving cell. The first power headroom report and the second power headroom report can be Type 1 power headroom reports.

14 Claims, 6 Drawing Sheets

METHOD AND APPARATUS FOR POWER HEADROOM REPORTING PROCEDURE FOR DIFFERENT SERVING CELLS

BACKGROUND

1. Field

The present disclosure is directed to a method and apparatus for power headroom reporting procedure for new radio, such as 5G, carrier aggregation.

2. Introduction

Presently, User Equipment (UE), such as user wireless communication devices, communicate with other communication devices using wireless signals. To support various requirements of different services, at least including enhanced Mobile Broadband (eMBB), Ultra-Reliable Low-Latency Communications (URLLC), and massive Machine Type Communication (mMTC)), 5G/New Radio (NR) is envisioned to support different Orthogonal Frequency Division Multiplexing (OFDM) numerologies, such as subcarrier spacing (SCS), and Cyclic Prefix (CP) length in a single framework.

As identified in 3rd Generation Partnership Project (3GPP) Technical Report (TR) 38.913, the various use cases/deployment scenarios for NR have diverse requirements in terms of data rates, latency, and coverage. For example, eMBB is expected to support peak data rates, such as 20 Gbps for downlink and 10 Gbps for uplink, and user-experienced data rates in the order of three times what is offered by International Mobile Telecommunications (IMT)-Advanced. On the other hand, in case of URLLC, the tighter requirements are put on ultra-low latency, such as 0.5 ms for UL and DL each for user plane latency, and high reliability, such as $1-10^{-5}$ probability that a packet does not go through within 1 ms. Finally, mMTC requires high connection density, large coverage in harsh environments, and extremely long-life battery for low cost devices. Therefore, the OFDM numerology, such as subcarrier spacing, OFDM symbol duration, CP duration, and number of symbols per scheduling interval, that is suitable for one use case might not work well for another.

For example, low-latency services may require shorter symbol duration, and thus larger subcarrier spacing, and/or fewer symbols per scheduling interval, such as Transmit Time Interval (TTI), than an mMTC service. Furthermore, deployment scenarios with large channel delay spreads require a longer CP duration than scenarios with short delay spreads. The subcarrier spacing should be optimized accordingly to retain the similar CP overhead. It was agreed to study different numerologies across different carrier(s) for a given UE as well as different numerologies within the same carrier for a given UE. For example, different OFDM numerologies are multiplexed in the frequency-domain and/or the time-domain within the same carrier or across different carriers. This benefits simultaneous support of services with vastly different requirements, such as ultra-low latency communications with short symbols and thus wide subcarrier spacing and Multimedia Broadcast/Multicast Service (MBMS) services with long symbols to enable long cyclic prefix and thus narrow subcarrier spacing.

In Long Term Evolution (LTE), a UE reports an extended Power Headroom Report (PHR) for carrier aggregation. For example, Power Headroom (PH) info for each activated serving cell is included together with Pcmax. Since the subframe/TTI length is the same for all carriers in LTE, the PHR reporting subframes, such as the subframes which the power headroom information refers to, are aligned. However, for NR, one slot/TTI of a carrier can overlap with multiple slots/TTIs of another carrier due to the support of different numerologies. For example, eMBB on one carrier can overlap with URLLC on another carrier. In this case, a 5G NodeB (gNB), such as a 5G base station, will not be aware of which slot a power headroom information refers to when receiving an extended PHR. For example, in a scenario where an extended PHR report is triggered and subsequently transmitted in a slot/TTI that overlaps with multiple slots/TTIs on a different carrier, the gNB would not know which overlapped slot/TTI is the reference for the PH calculation. Therefore it may base its future scheduling decisions on wrong assumptions, such as how close the UE is operating on the power limit, which may lead to either power scaling or under-utilization of resources.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for power headroom reporting procedure for New Radio (NR), such as 5G, carrier aggregation. According to a possible embodiment, a first Component Carrier (CC) having a first Transmit Time Interval (TTI) and a second CC having a second TTI can be communicated on. A Power Headroom Report (PHR) can be ascertained to have been triggered for at least one selected from the first CC and the second CC. An uplink grant corresponding to an uplink transmission can be received on the first CC. A first PHR reference TTI corresponding to the uplink transmission on the first CC can be determined. A first PHR for the first CC can be generated based on the first PHR reference TTI. A second PHR reference TTI on the second CC can be determined. A second PHR for the second CC can be generated based on the second PHR reference TTI. The first PHR and the second PHR can be transmitted in the uplink transmission.

Figure 1:
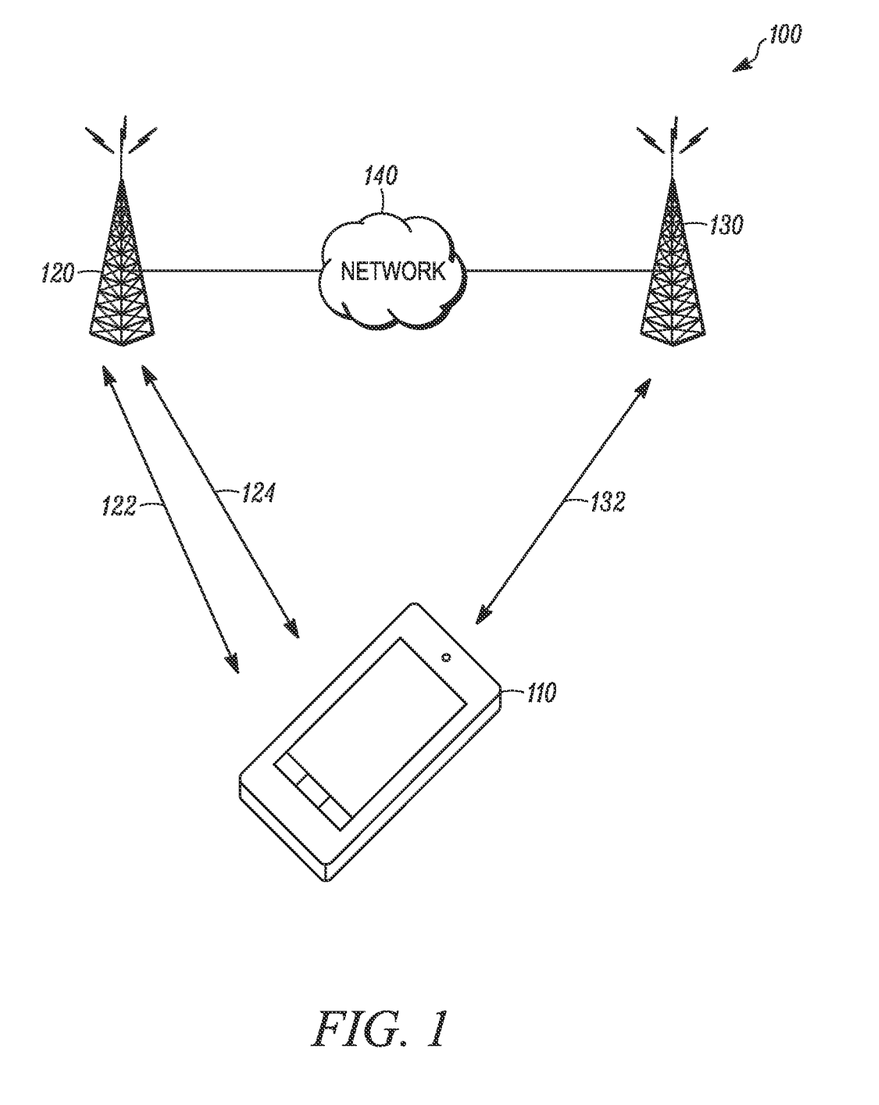
FIG. 1 is an example block diagram of a system according to a possible embodiment.

FIG. 1 is an example block diagram of a system 100 according to a possible embodiment. The system 100 can include a User Equipment (UE) 110, base stations 120 and 130, and a network 130. The UE 110 can be a wireless wide area network communication device, a wireless terminal, a portable wireless communication device, a smartphone, a cellular telephone, a flip phone, a personal digital assistant, a personal computer, a selective call receiver, a tablet computer, a laptop computer, an Internet of Things (IoT) device, or any other user device that is capable of sending and receiving communication signals on a wireless network. At least one of the base stations 120 and 130 can be a wireless wide area network base station, a NodeB, an enhanced NodeB (eNB), a 5G, such as a NR, NodeB (gNB), an unlicensed network base station, an access point, or any other base station that can provide wireless access between a UE and a network.

The network 140 can include any type of network that is capable of sending and receiving wireless communication signals. For example, the network 140 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a 4G network, a 5G NR network, a satellite communications network, a high altitude platform network, the Internet, and/or other communications networks. In operation, the UE 110 can communicate with other devices over the network 140 by sending and receiving signals to and from the base stations 120 and 130 over component carriers 122, 124, and 132.

Uplink transmit power control in a mobile communication system, such as the system 100, serves the purpose of balancing the need for sufficient transmitter energy per bit to achieve the required Quality of Service (QoS) against the need to minimize interference to other users of the system and to maximize the battery life of the UE 110. To achieve these goals, uplink power control can adapt to the radio propagation channel conditions including path loss, shadowing, and fast fading fluctuations while limiting the interference effects from other users, within a cell, and from neighboring cells. 3GPP has adopted a power control scheme for LTE that allows for full or partial compensation of path loss and shadowing. This functionality makes users with a higher path-loss operate at a lower SINR requirement so that they will more likely generate less interference to neighboring cells. The power control scheme used in LTE employs a combination of open-loop and closed-loop control. The open-loop component compensates for the slow channel variations based on signal strength measurements performed by the terminal, e.g. path-loss measurement. The closed-loop component, on the other hand, directly controls the a UE's power using, for example, explicit Transmit Power Control (TPC) commands in the downlink to optimize the system performance. This controls interference and fine-tunes the power settings to suit the channel conditions including fast fading.

The detailed power control formulas are specified in section 5.1 in 3rd Generation Partnership Project (3GPP) Technical Specification (TS) 36.213 for the Physical Uplink Shared Channel (PUSCH), the Physical Uplink Control Channel (PUCCH), and the Sounding Reference Signals (SRS). For example, the setting of the UE 110 transmit power for a Physical Uplink Shared Channel (PUSCH) transmission in subframe i on serving cell c is defined as follows:

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}_{[dBm]},$$

where $P_{CMAX,c}$ can be the configured UE transmit power defined in subframe i for serving cell c. For LTE 8/9 there may be only one serving cell. Therefore, $P_{CMAX,c}$ can be replaced by $P_{CMAX}$ in the equation above. The same can also be done for the other variables. For example, $M_{PUSCH,c}$ can be replaced by $M_{PUSCH}$, etc. In Rel-10, the support of multiple serving cell, also referred to as carrier aggregation, was introduced. $M_{PUSCH,c}$ can be the number of Physical Resource Blocks (PRBs) allocated to the UE 110. The more PRBs that are allocated to the UE 110, the greater the UE transmission power required. $P_{O\_PUSCH,c}$ can be the target received power, ac can be the pathloss compensation factor, and $PL_c$ can be the pathloss between the UE 110 and its serving base station, such as base station 120. $\Delta_{TF,c}$ and $f_c(i)$ can be the closed loop power control parameters that represent the Modulation and Coding Scheme (MCS)-dependent parameter and the Transmission Power Control (TPC) command, respectively.

The formula for each of these uplink signals, PUSCH, PUCCH, and SRS, can follow the same basic principles where in all cases they can be considered as a summation of two main terms: a basic open-loop operating point derived from static or semi-static parameters signaled by the base station 120 and a dynamic offset updated from subframe to subframe. The base station 120 can also be referred to as an eNB 120 and/or a gNB 120 herein, depending on the context of the reference.

In order to assist the eNB 120 to schedule uplink transmission resources to different UEs in an appropriate way, the UE 110 can report its available power headroom to the eNB 120. The eNB 120 can, based on a received power headroom report, determine how much more uplink bandwidth per sub-frame the UE 110 is capable of using, such as how close the UE 110 operates to its transmission power limits. The power headroom indicates the difference between the UE maximum uplink transmit power and the estimated power for Uplink Shared Channel (UL-SCH) transmission. For Rel-8/9 the UE power headroom in dB valid for sub-frame i can be defined by:

$$PH(i)=P_{CMAX}-\{10-\log 10(M_{PUSCH}(i))+P_{0\_PUSCH}(j)+\alpha(j)\cdot PL+\Delta_{TF}(i)+f(i)\}$$

where $P_{CMAX}$ can be the total maximum UE transmit power and can be a value chosen by the UE 110 in the given range of $P_{CMAX\_L}$ and $P_{CMAX\_H}$ based on the following constraints:

$$P_{CMAX\_L} \leq P_{CMAX} \leq P_{CMAX\_H}$$

$$P_{CMAX\_L}=\min(P_{EMAX}-\Delta TC, P_{PowerClass}-MPR-AMPR-\Delta_{TC})$$

$$P_{CMAX\_H}=\min(P_{EMAX}, P_{PowerClass})$$

$P_{EMAX}$ can be the value signaled by the network 140 and ΔTC, MPR and AMPR can be specified in 3GPP TS 36.101. MPR can be a power reduction value used to control the Adjacent Channel Leakage Power Ratio (ACLR) associated with the various modulation schemes and the transmission bandwidth. AMPR, such as A-MPR, can be the Additional Maximum Power Reduction. It can be a band specific value and can be applied by the UE 110 when configured by the network.

The range of the power headroom report can be from +40 to −23 dB. The negative part of the range can enable the UE 110 to signal to the eNB 120 the extent to which it has received an UL grant that would require more transmission power than the UE 110 has available. This can enable the eNB 120 to reduce the amount of uplink resources in a subsequent grant, thus freeing up transmission resources which could be then allocated to other UEs.

A Power Headroom Report (PHR), such as a PHR Medium Access Control (MAC) Control Element (CE), may only be sent in a sub-frame for which the UE 110 has a valid uplink resource, such as a PUSCH resource. The report can relate to the sub-frame in which it is sent. The PHR therefore can be an estimation, rather than a direct measurement. For example, the UE 110 may not directly measure its actual transmission power headroom for the subframe in which the report is to be transmitted.

A number of criteria can be defined to trigger a PHR. Such criteria can include a significant change in estimated path loss since the last PHR has been sent, such as more than a configured threshold, can be periodic power headroom reporting, and can be other criteria. The eNB 120 can configure parameters to control each of these triggers depending on the system load and the requirements of its scheduling algorithm. The PHR can be sent as a MAC Control Element (CE). For Rel-8/9 it can include a single octet, where the two highest bits can be reserved and the six lowest bits can represent the 64 dB values mentioned above in 1 dB steps.

For details of the PHR MAC CE please refer to TS 36.321, section 6.1.3.6. For the case of carrier aggregation, which is a Rel-10 feature, there is one independent power control loop for each UL component carrier/serving cell configured for the UE 110. As already mentioned above, the setting of the UE transmit power for a PUSCH transmission in subframe i on serving cell c is defined as follows:

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}_{[dBm]}$$

Further details about the power control formulas for PUSCH, PUCCH and SRS can be found in TS 36.213.

Since UL power control is operated per component carrier/serving cell, power headroom can also be reported per component carrier/serving cell, i.e. PH=$P_{CMAX,c}$—estimated PUSCH power. For the case of carrier aggregation, there can be basically two power limits defined, a total maximum UE transmit power $P_{CMAX}$ and a component carrier-specific maximum transmit power $P_{CMAX,c}$. Further information about the definition of component carrier-specific maximum transmission power respectively the UE total maximum transmission power can be found in TS 36.101. For carrier aggregation simultaneous PUSCH-PUCCH transmission is supported. An additional power headroom type can indicate the differences between $P_{CMAX,c}$ and the estimated PUSCH+PUCCH TX power. Consequently, two different types of PH types are reported for CA:

PH type 1: $P_{CMAX,c}$—estimated PUSCH power
PH type 2: $P_{CMAX,c}$—estimated PUSCH+PUCCH power,
where PH type 2 may only be applicable for a primary cell, PCell, whereas PH type 1 can be reported for both PCell and a secondary cell, SCell. A PHR can account for the Maximum Power Reduction (MPR). In other words, the power reduction applied by the UE 110 can be taken into account in the component carrier specific maximum transmission power $P_{CMAX,c}$. It should be noted that the eNB 120 may not have knowledge of the power reduction applied by the UE 110, since the actual power reduction depends on the type of allocation, the standardized MPR value, and also on the UE implementation. Therefore, the eNB 120 may not know the component carrier specific maximum transmission power relative to which the UE 110 calculates the power headroom. In particular, the eNB 120 may not precisely know how close UE 110 is operating to its total maximum transmission power $P_{CMAX}$. Hence, there may be situations where UE 110 is exceeding the total user equipment maximum transmission power $P_{CMAX}$ that would require power scaling. Therefore, in Rel-10 a new power headroom MAC control element, also referred to as extended PHR MAC CE, can be used. Since it can be beneficial for the eNB 120 to always know the power situation for all activated uplink carrier/serving carrier for future uplink scheduling, the new extended power headroom MAC CE can include power headroom information (Type 1/Type 2) for each activated uplink component carrier. Whenever a PHR is triggered on any of the configured serving cells/component carrier, the UE 110 can send an extended PHR MAC CE which can contain information for all serving cells.

Furthermore, the UE 110 may not only report the power headroom value for a component carrier but also can report the corresponding $P_{CMAX,c}$ value. When a power headroom report is triggered, the UE can transmit the extended power headroom MAC control element on one of the serving cells, such as PCell and Scells, that has a valid uplink resource for PUSCH. In cases where PUSCH and PUCCH are not transmitted, Type 1 and Type 2 PH can be calculated based on some predefined reference format. The corresponding PH report can also be referred to as virtual PHR. For example, the PH can be calculated using some virtual PUSCH and/or PUCCH transmission, respectively. Further details of the extended power headroom MAC control element can be found in section 6.1.3.6a of standard TS 36.321.

Dual Connectivity (DC), which was introduced in Rel-12, can allow a UE to receive data simultaneously from different eNBs in order to boost the performance in a heterogeneous network with dedicated carrier deployment. More in detail, a UE in RRC_CONNECTED state can be configured to utilize radio resources provided by two distinct schedulers, located in two eNBs connected via an interface, also referred to as an X2 interface.

There can be a Master eNB (MeNB) and one or more Secondary eNBs (SeNB). In LTE release 12 specifications, only the case of one MeNB and one SeNB is considered. The group of serving cells associated with the MeNB can be referred to as a Master Cell Group (MCG), whereas the group of the serving cells associated with the SeNB can be called a Secondary Cell Group (SCG). Scheduling of uplink transmissions in dual connectivity can be more challenging compared to carrier aggregation since the scheduling decisions made in MeNB and SeNB cannot be coordinated instantaneously due to the non-ideal interface between the two schedulers. Therefore, it can easily happen that the scheduling grants from MeNB and SeNB may result in a situation where a UE's maximum transmission power is exceeded, leading to power scaling. In order to avoid those situations, a minimum guaranteed power for the cell groups, such as P_MCG for MCG and P_SCG for SCG, respectively, has been introduced. More in detail, the guaranteed minimum power level of a cell group can be configured as a percentage of the maximum UE transmission power $P_{CMAX}$. The sum of the minimum guaranteed power level for both cell groups can be equal or smaller than $P_{CMAX}$. For the case that P_MCG+P_SCG<$P_{CMAX}$ the remaining power that is not dedicated to a specific cell group can be dynamically allocated to the MCG or SCG depending on the scheduling decision. In the case where less than the minimum guaranteed power is required for transmission in one of the cell groups, the power can be allocated to the other cell group.

Dual connectivity can be used both for synchronous and asynchronous networks. In order to account for both network deployments, two power control modes have been introduced for Rel-12. In particular, Power Control Mode 1 (PCM1) can be used in synchronous networks, whereas PCM2 can be used for asynchronous networks. All Rel-12 should support PCM1. For UEs that are also supporting PCM2 for asynchronous networks, the eNB can configure which power control mode to use. For the PCM1, the remaining power, $P_{CMAX}$–(P_MCG+P_SCG), can be allocated to the MCG and/or SCG according to some predefined priority order, such as according to the Uplink Control Information (UCI) type. Basically, the highest priority can be given to the Hybrid Automatic Repeat Request (HARQ) feedback and Scheduling Request (SR) transmissions. Second highest priority can be given to Channel State Information (CSI), followed by PUSCH transmissions without Uplink Control Information (UCI), and finally Sounding Reference Signal (SRS) transmission. In case the same UCI type transmission takes place for MCG and SCG, MCG transmissions can be prioritized. Further details about the PCM1 for Dual connectivity can be found in TS 36.213 section 5.1.4.

In the asynchronous network case, sub-frame boundaries may not be aligned between MCG and SCG transmissions. Since the UE 110 cannot process uplink grants received for the other CG quickly enough when determining the transmission power for its own cell group, the UE 110 may not consider the required transmission power for PUSCH/PUCCH transmissions on the other cell group for the overlapping symbols. Therefore, for the PCM2 the remaining power can be allocated simply to the transmission that starts earlier. More details about PCM2 can be also found in section 5.1.4 of TS 36.213.

In Dual Connectivity when a PHR has been triggered, the UE 110 can send power headroom information for all activated cells, including serving cells of both cell groups, to the eNB 120. When the UE 110 reports PH info of SCG cells to the MeNB or PH info of MCG cells to the SeNB, Type 2 PH information for the PUCCH cell, the sPUCCH for the SCG, may always be included. Power headroom info for the serving cells in the other CG can depend on eNB configuration, either calculated based on some reference format, such as a virtual PHR, or based on actual PUSCH/PUCCH transmissions.

According to a possible embodiment, a power headroom reference slot/Transmit Time Interval (TTI) can be defined for the case of aggregating carriers with different numerologies. Any of the overlapping slots/TTIs can be defined as reference slot/TTI for power headroom calculation. The gNB 120 can know which slot/TTI the power headroom calculation is based on, so that it can interpret a received PHR correctly.

Figure 2:
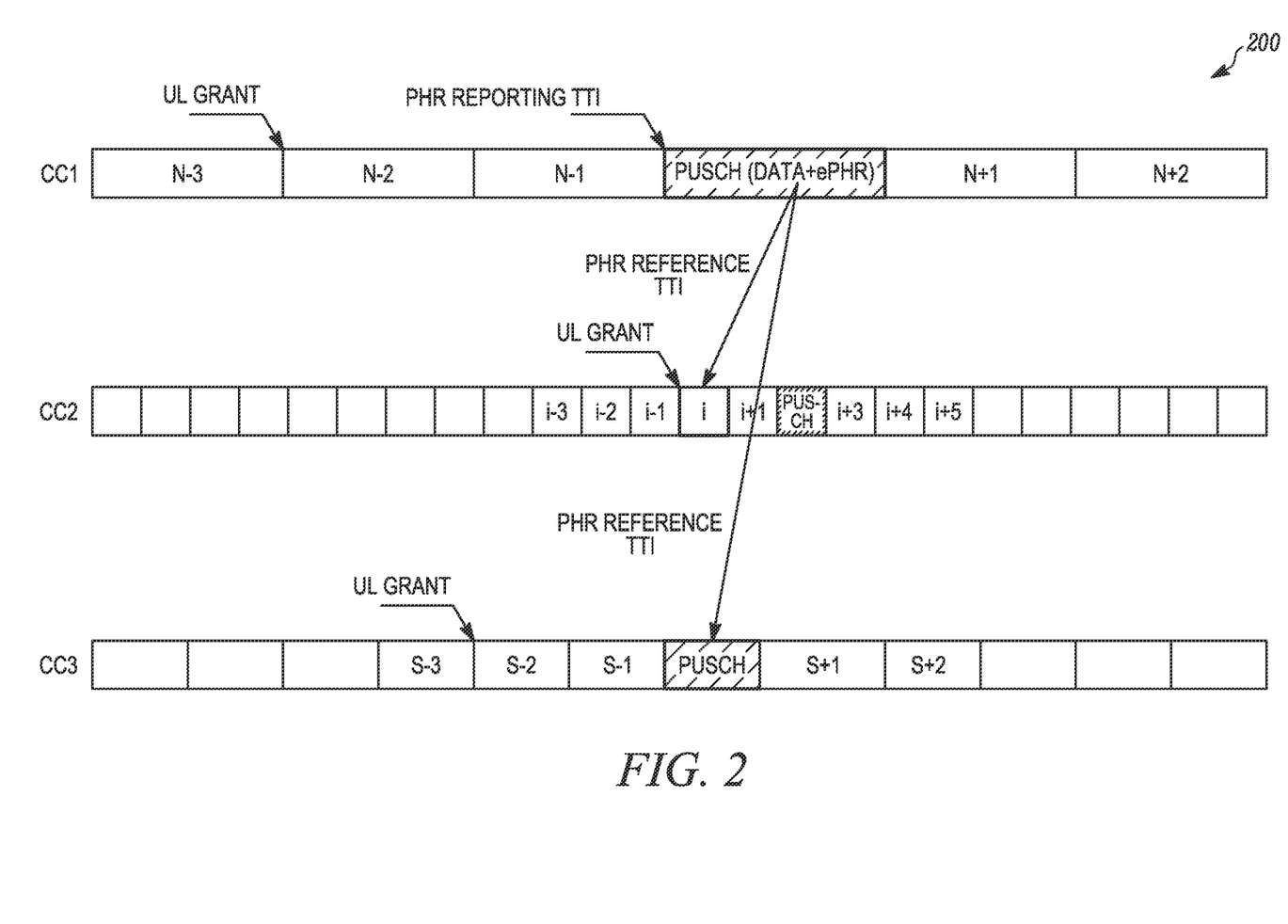
FIG. 2 is an example illustration of a scenario showing power headroom reporting subframes and uplink grants for different component carriers according to a possible embodiment.

FIG. 2 is an example illustration of a scenario 200 showing PHR reporting TTIs and uplink grants for different component carriers, CC1, CC2, and CC3, according to a possible embodiment, where TTIs are referred to as sub-frames. In this scenario 200, the UE 110 can be configured with three component carriers/serving cells, each of them having a different numerology/TTI length. The PHR has been triggered before $TTI_{N-3}$, based on some defined criteria, and is transmitted in $TTI_N$ on the first carrier (CC1).

Since $TTI_N$ on CC1 spans over $TTI_i$ to $TTI_{i+3}$ on CC2 and TTIs to $TTI_{S+1}$ on CC3, a PHR reference TTI should be defined in order to ensure that gNB 120 interprets the received PHR correctly. More in detail, the reference TTI can be defined, for example, based on whether PH information for CC2, as reported in extended PHR MAC CE on CC1, has been calculated for $TTI_i$, $TTI_{i+1}$, $TTI_{i+2}$, or $TTI_{i+3}$.

From technical point of view there are some reasons to define the reference TTI in a specific way, which are outlined in the following, even though as mentioned above, it may generally be sufficient to have a defined rule how to determine the reference TTI for PHR calculation.

Since power headroom can be calculated based on a received UL grant, such as estimated UL power according to the grant, when having different TTI lengths and potentially also different (HARQ) timing relations, such as from UL grant to corresponding UL transmission, it may be that the UE 110, when generating the extended PHR MAC CE, may not know whether there will be some uplink transmission on the other carriers in the reference slots/TTIs/subframes. The UE 110 may not be fast enough to process the UL grant(s) for the overlapping slots/TTI(s) on the other carriers when calculating the power headroom information. As an example related to the scenario 200, when generating the extended PHR MAC CE for transmission on CC1 in $TTI_N$, the UE may not be aware of the presence of a UL grant in $TT_{i+1}$ corresponding to a PHR reference TTI in $TTI_{i+3}$ on CC2. Therefore, the $TTI_{i+3}$ may not be a good choice as PHR reference TTI. According to this example, if the PHR reference TTI were defined as $TTI_{i+3}$, such as the last overlapped TTI, the corresponding uplink grant can be received in $TTI_{i+1}$. In this implementation, the scenario 200 can only be an example showing that an UL grant in $TTI_i$ can correspond to an uplink transmission in $TTI_{i+2}$.

Given above the considerations, according to this embodiment, the reference TTI for PH calculation can be defined as the first overlapping TTI, as shown in the scenario 200. The detailed UE 110 behavior according to this embodiment can include the following: When the power headroom procedure has determined that at least one PHR has been triggered in $TTI_{N-2}$ on CC1, where an uplink grant is received corresponding uplink transmission takes place in $TTI_N$ on CC1, the UE 110 can start to generate the extended PHR MAC CE. In order to do so, the UE 110 can first determine the PHR reference slot/TTI for the other activated component carrier/serving cells, i.e. $TTI_i$ on CC2 and TTIs on CC3 according to this embodiment. Furthermore, the UE 110 can determine the slot/TTI where the UL grants associated to the respective PHR reference TTI occur, i.e. $TTI_{i-2}$ on CC2 and $TTI_{S-2}$ on CC3. The UE 110 can monitor for a PDCCH (UL grant) in those slots/TTIs in order to know whether a transmission will take place in the PHR reference TTI and hence to be able to calculate the power headroom for the reference TTI. The UE 110 can then calculate the power headroom for $TTI_N$ on CC1, the power headroom for TTI on CC2, and the power headroom for TTIs on CC3 and generate the PHR MAC CE which is transmitted in $TTI_N$ on CC1.

The definition of the PHR reference TTI according to this embodiment can ensure that the corresponding UL grants for the other carriers/serving cells can be considered by the UE for the calculation of the extended PHR MAC CE. However, it may be still the case that the processing timing can be too tight and the UE 110 may report a virtual PHR for other cells/component carriers. For example, uplink grants on other cells may not be considered for PH calculation.

Again referring to the scenario 200, it may be preferable from a UE 110 processing point of view to transmit the extended power headroom report MAC CE on CC3 in TTIs rather than on CC1 in $TTI_i$. The reason is that the UE 110 can already be aware of a received uplink grant on CC1 in $TTI_{N-2}$ when calculating the power headroom report MAC CE for transmission on CC3 and can also consider a potential UL grant received in $TTI_{i-2}$ on CC2. In general, the UE 110 can transmit the extended PHR MAC CE on that carrier that allows for the UE 110 to consider uplink grants on the other carrier/serving cells, such as the shortest time duration between the uplink grant and the corresponding uplink transmission.

Due to the support of multiple numerologies across and within a serving cell, there may be different timing relations between an UL grant and the corresponding uplink transmission for different component carrier/serving cells, as already outlined above. Therefore, it may happen that the UE 110 may not process and consider all potential uplink grants associated with the PHR reference TTI for all serving cells when calculating the PH information for transmission of the PHR MAC CE. As another example related to the scenario 200, the UE 110 may not be able to consider a potential Uplink transmission in $TTI_i$ on CC2 since a potential UL grant is received in $TTI_{i-2}$ when calculating the PH info for all three component carriers/serving cells for generating the extended PHR MAC CE that is transmitted in $TTI_N$ on CCL. While the scenario 200 shows one exemplary grant on CC2 in order to show the timing relation between UL grant and corresponding uplink transmission, in this example, since reference PHR TTI for CC2 is according to one embodiment $TTI_i$, the corresponding uplink grant can be received in $TTI_{i-2}$. According to this embodiment, for the case that the UE 110 is unable to determine whether there is an uplink transmission in the PHR reference TTI for any of the activated serving cells when generating the PHR MAC CE, the power headroom can be calculated assuming that no uplink transmission is taking place. For example, a virtual PH can be reported for the corresponding serving cell.

For NR, a grant-free uplink transmission mode can be supported, where uplink resources are pre-allocated to the UE 110, such as similar to Semi-Persistent Scheduling (SPS) operation in LTE, thereby avoiding the need to first send a scheduling request and wait for an uplink grant before being able to send an uplink transmission. The grant-free transmission mode can be used for very delay critical services like URLLC. Since the UE 110 may have a valid uplink grant for every TTI, such as where SPS periodicity is set to one TTI, the UE 110 may only use the assigned resources and make an uplink transmission when there is uplink data available for transmission. The UE 110 can skip an uplink transmission opportunity, such as ignore the uplink grant, in case there is no data available for transmission. Similar to the embodiment described just above, the UE 110 may not be able to determine whether there will be an uplink transmission for a grant-free transmission mode in the PHR reference TTI when generating the content of the extended PHR MAC CE, such as depending on the data availability, the UE 110 can ignore or follow the UL grant. In this case the UE 110 can, according to this embodiment, assume that there is no uplink transmission taking place. For example, a virtual PH can be reported for the corresponding serving cell.

Figure 3:
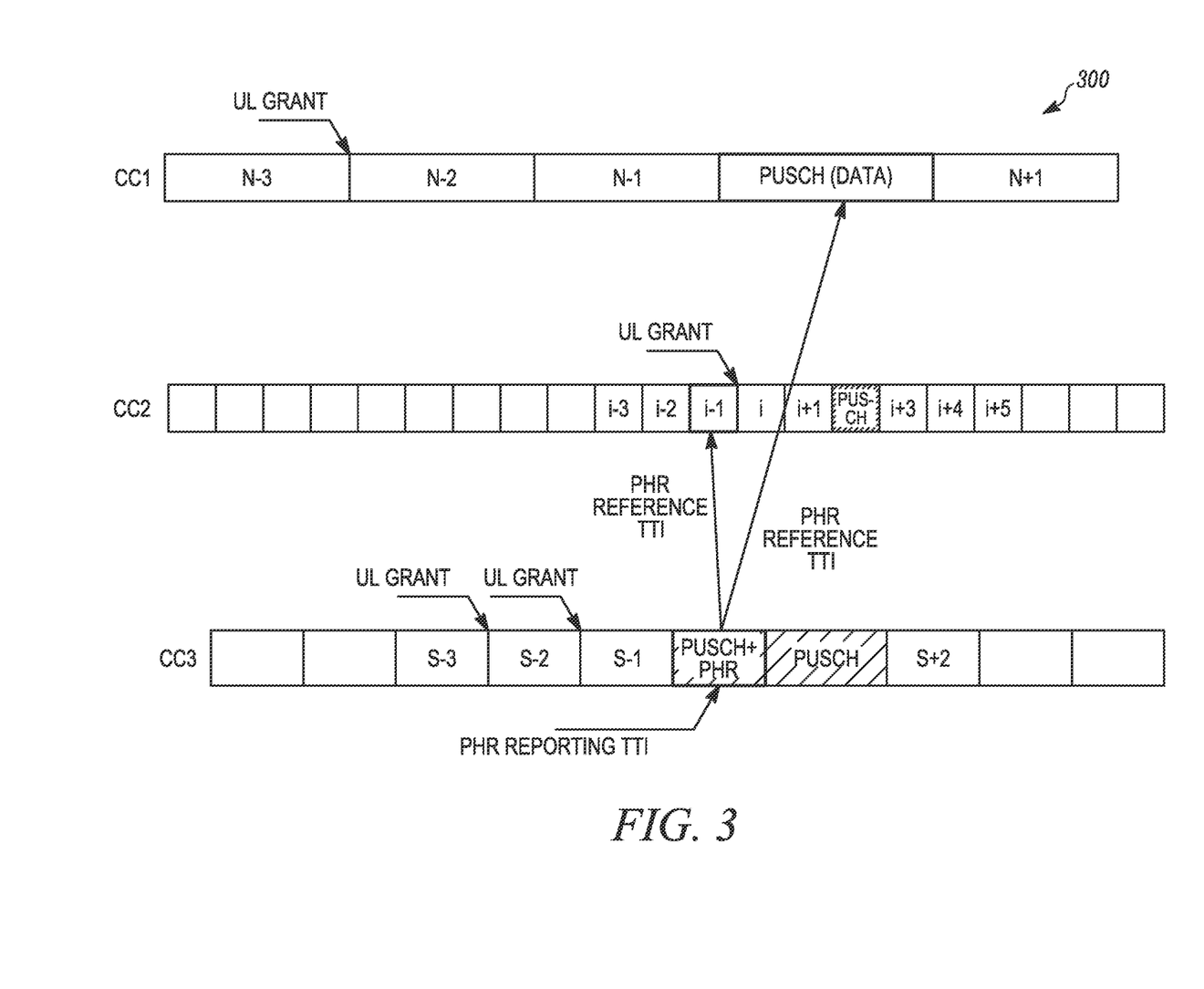
FIGS. 3 and 4 are example scenarios illustrating when slot/transmit time interval boundaries for component carriers are not aligned according to a possible embodiment.
Figure 4:
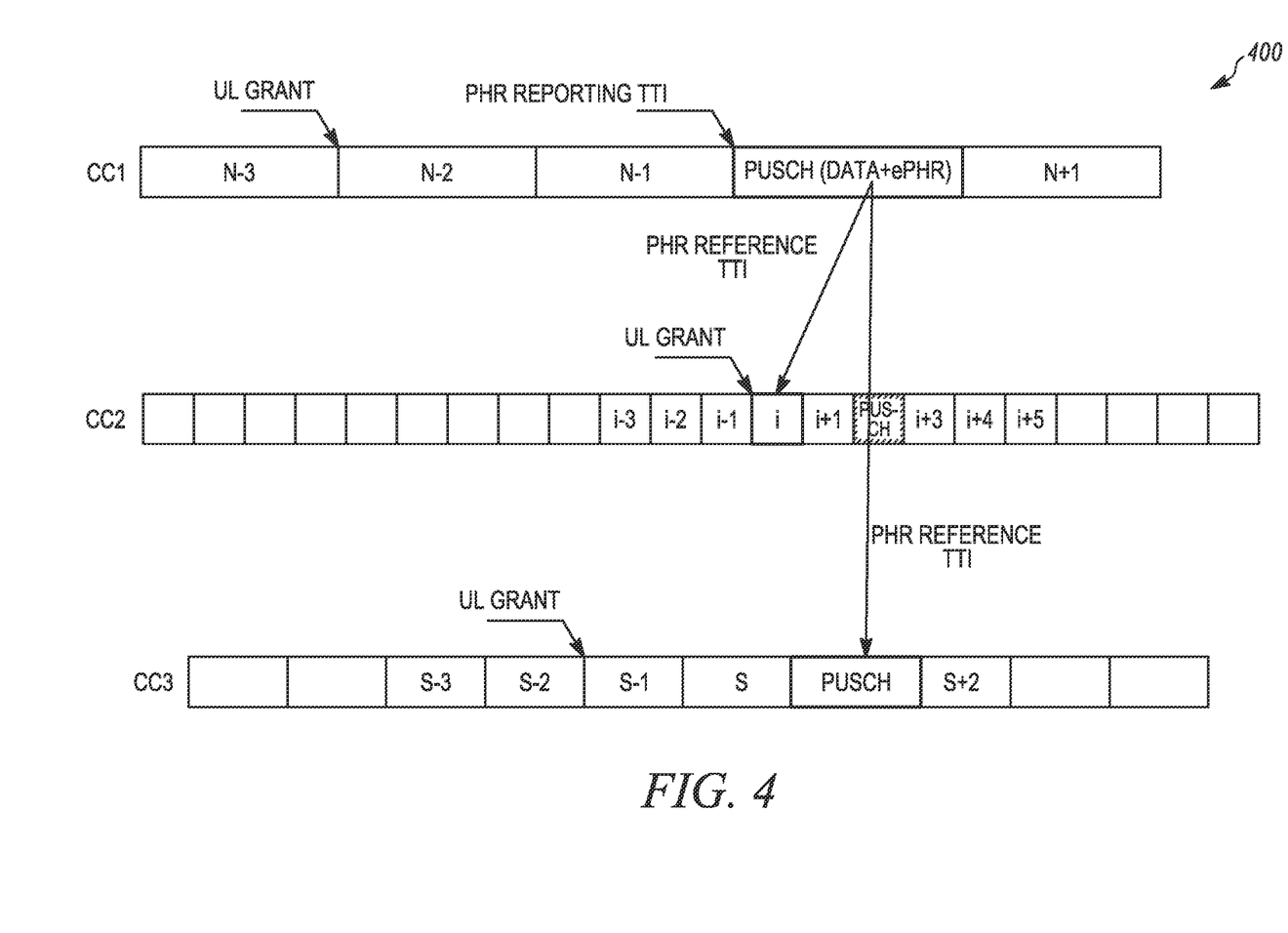

FIGS. 3 and 4 are example scenarios 300 and 400 illustrating when slot/TTI/boundaries for CC1 and CC3 are not aligned according to a possible embodiment. For example, for NR CA, even though the symbol timing may be aligned across different carriers/serving cells, the slot/TTI boundaries may not be aligned. For such cases depicted in the scenarios 300 and 400, the reference PHR TTI can be defined. As shown in the scenario 400, the PHR reference TTI can be defined as the first fully overlapped TTI, such as $TTI_{S+1}$ on CC3 and $TTI_i$ on CC2, according to this embodiment. Choosing, for example, TTIs for CC3 as the reference TTI can mean that the reference TTI starts earlier than the TTI where the PHR is transmitted, such as in $TTI_N$ on CC1 which can be avoided according to this embodiment. For the same reasoning the PHR reference TTI for CC1 can be defined as $TTI_N$ in the scenario 300, e.g., the PHR reference TTI may not start earlier than the TTI where PHR MAC CE is transmitted.

According to another embodiment the UE 110 can calculate the power headroom for the component carriers/serving cells where the PHR MAC CE is not transmitted on always based on some reference format, such as using as predefined resource allocation. Taking the scenario 200 as an example, according to this embodiment, the UE 110 can calculate the PH for CC1, for example, the PHR MAC CE can be transmitted on CC1, based on the actual uplink transmissions and the UE 110 can calculate PH for CC2 and CC3 based on a reference format, such as using a virtual PHR. This embodiment can allow simple calculation of the power headroom info for all active carrier/serving cells from a processing power point of view. For example, there may be no dependency on the different timing relations/TTI lengths due to different used numerologies on the carriers. According to a possible implementation, the network 140 may configure whether the PH for the component carrier/serving cells on which the PHR MAC CE is not transmitted on can be calculated based on actual uplink transmission or based on some reference format/allocation.

Numerology specific power control parameters can also be supported. For example, in order to meet the stringent reliability requirements for URLLC traffic, the parameter P0_PUSCH and/or a can be configured differently for a numerology used for URLLC compared to a numerology used for eMBB. For a power headroom report calculated based on a reference transmission/format, such as a virtual PHR, the gNB 120 can be aware of which uplink power control parameters the UE 110 is using for the calculation in order to interpret the PH info correctly. Therefore, according to this embodiment, a predefined numerology can be used for the calculation of a virtual PHR. According to one implementation, the UE 110 can use the reference numerology of the component carrier/serving cell for the calculation of the power headroom based on a reference transmission/format. A UE can have one reference numerology in a given NR carrier that can define the subframe duration for the given NR carrier.

According to another embodiment, the serving cells/carriers for NR CA can be grouped into several power headroom reporting groups. For example, according to one implementation, the serving cells with same numerologies or TTI length can be grouped together. Since timing granularity can be the same between serving cells/carriers within a PHR group, the PHR reporting for a PHR group can be similar to an LTE CA case. The network 140 can configure the UE 110 with the different PHR grouping information. The UE 110 can send power headroom information for all activated serving cells/carriers of a PHR group, such as an extended PHR MAC CE per PHR group. The PH report, such as PHR MAC CE, can be sent on any serving cell of the PHR group with available uplink resources.

There can be PHR trigger conditions defined per PHR group. For example, PHR can be triggered for a PHR group in case trigger conditions is met for at least one of the serving cells contained in a PHR group. Alternately, trigger conditions can be common to all serving cells/carriers regardless of a PHR group. Since for NR a UE may aggregate serving cells/carriers from different frequency bands, such as high frequency carriers above 6 Ghz and low frequency carriers below 6 Ghz, where radio channel conditions are quite different, there can be one dl-Pathloss-Change value defined per PHR reporting group with an assumption that HF carriers and LF carriers are grouped in different PHR groups.

According to another additional embodiment, the PHR trigger can be propagated to the other PHR groups when a PHR has been triggered for one PHR group. This propagation of the PHR trigger can ensure that PHR is transmitted for all PHR groups when a PHR has been triggered in any of the PHR groups.

Since there may be different parameter settings for different beam links, the pathloss also may be quite different when changing beam link. According to another additional embodiment, when changing the beam link/pair and informing the gNB about this, the UE can also trigger PHR (since channel condition may also change significantly when changing the Beam link). According to one embodiment, the PHR is reported together with beam link/pair related information.

Figure 5:
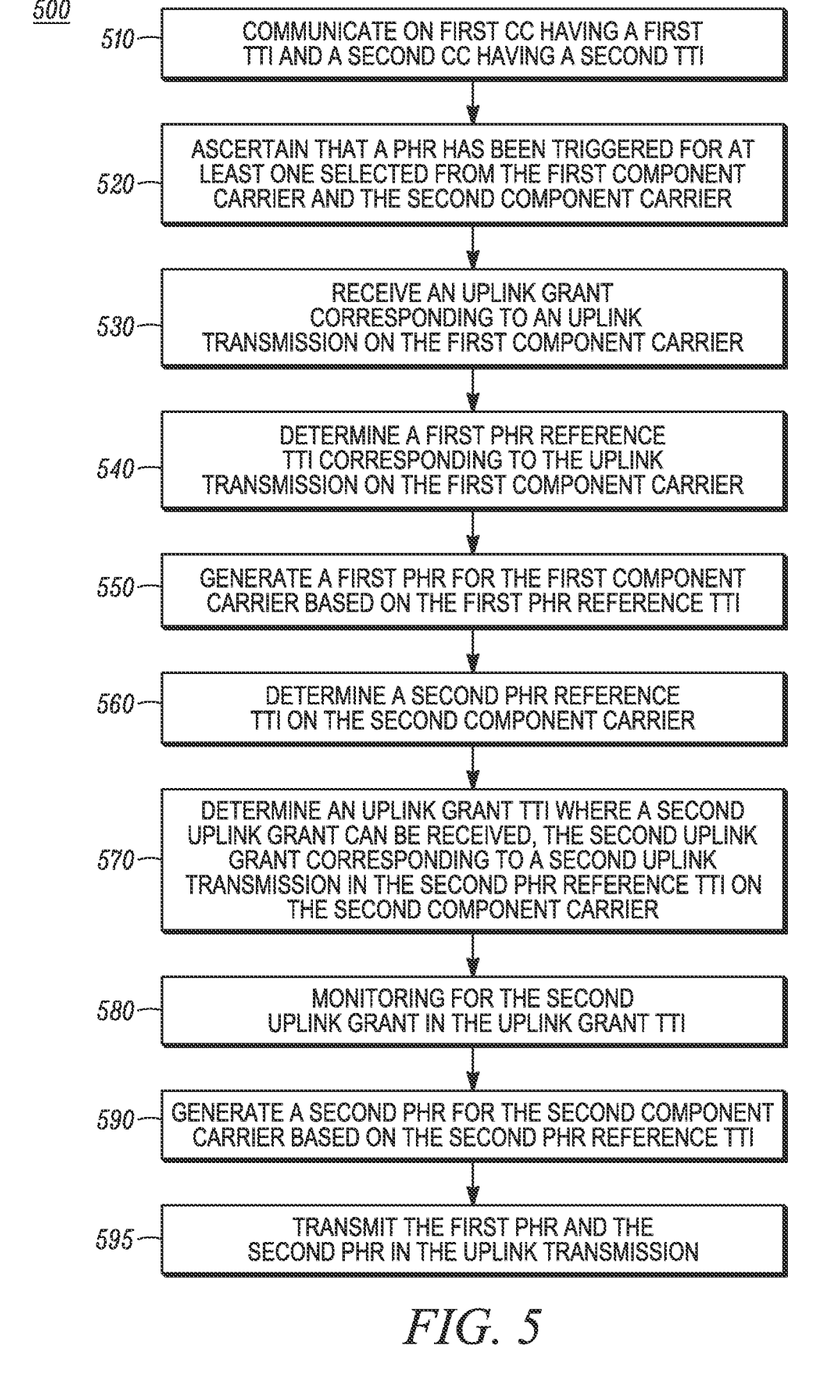
FIG. 5 is an example flowchart illustrating the operation of an apparatus according to a possible embodiment.

FIG. 5 is an example flowchart 500 illustrating the operation of an apparatus, such as the UE 110, according to a possible embodiment. At 510, a first component carrier having a first TTI and a second component carrier having a second TTI can be communicated on. The second TTI can be different from, or the same as, the first TTI. At 520, a PHR can be ascertained to have been triggered for at least one of the first component carrier and/or the second component carrier.

At 530, a first uplink grant corresponding to a first uplink transmission on the first component carrier can be received. At 540, a first PHR reference TTI corresponding to the first uplink transmission on the first component carrier can be determined. The first PHR reference TTI can be the TTI for which the first uplink grant grants the first uplink transmission on the first component carrier. At 550, a first PHR for the first component carrier can be generated based on the first PHR reference TTI.

At 560, a second PHR reference TTI on the second component carrier can be determined. According to a possible implementation, the first PHR reference TTI can begin at a first time, the uplink transmission can be a first uplink transmission, and the second PHR reference TTI can be the first overlapping TTI on the second component carrier where the first PHR reference TTI overlaps the second PHR reference TTI. For example, the second PHR reference TTI can be the first overlapping TTI on the second component carrier where the first uplink transmission overlaps the second PHR reference TTI. According to another possible implementation, the second PHR reference TTI can begin at a second time, where the first time of the first PHR reference TTI can be before the second time. According to another possible implementation, the second PHR reference TTI can be an overlapping TTI where one of the first uplink transmission and the second uplink transmission fully overlaps the other of the first uplink transmission and the second uplink transmission. According to another possible implementation, the second PHR reference TTI can be the first overlapping TTI on the second component carrier where one of the first PHR reference TTI and the second PHR reference TTI fully overlaps the other of the first PHR reference TTI and the second PHR reference TTI.

At 570, an uplink grant TTI where a second uplink grant can be received can be determined. The second uplink grant can correspond to a second uplink transmission in the second PHR reference TTI on the second component carrier. At 580, the second uplink grant can be monitored for in the uplink grant TTI. The second uplink grant can grant the second uplink transmission in the second PHR reference TTI beginning at the same time as the first PHR reference TTI.

At 590, a second PHR can be generated for the second component carrier based on the second PHR reference TTI. There can be additional component carriers, such as a third component carrier, and a PHR reference TTI can be determined and a corresponding PHR can be generated for each additional component carrier. The second PHR for the second component carrier for the second PHR reference TTI can be generated based on monitoring for the second uplink grant. The second PHR for the second PHR reference TTI can also be generated when the second uplink grant is received in the uplink grant TTI. The second PHR can further be generated using a predefined uplink transmission for the second component carrier when the UE 110 is unable to determine whether there is an uplink transmission on the second component carrier. The predefined uplink transmission can be a virtual uplink transmission. For example, the UE can generate the power headroom report by assuming there is no uplink transmission taking place on the second component carrier. The UE can also generate the PHR in this manner when the second uplink grant is not sent, such as when a grant-free transmission mode is being used. The UE can further generate the PHR in this manner as a default manner for generating the PHR and there may be no dependency on the different timing relations/TTI lengths due to different used numerologies on different carriers. According to a possible implementation, the second PHR can be generated based on a predefined numerology when using a predefined uplink transmission for the calculation of the second power headroom report. For example, the UE 110 can use the reference numerology of the component carrier/serving cell for the calculation of the power headroom based on a reference transmission/format. Component carriers with the same TTI can have the same numerology. According to another possible implementation, the second PHR can be generated only when the second TTI is same as the first TTI. In this implementation, power headroom information may only be sent for a group of component carriers having the same TTI, in contrast to reporting power headroom for each component carrier.

At 595, the first PHR and the second PHR can be transmitted in an uplink transmission, such as in the first uplink transmission. According to a possible implementation, the first uplink grant can be a first time period away from the first PHR reference TTI, the second uplink grant can be a second time period away from the second PHR reference TTI, and the PHR can be transmitted on the component carrier with the shortest time period between the corresponding uplink grant and the corresponding PHR reference TTI. For example, the UE 110 can transmit the extended PHR MAC CE on the carrier that allows for the UE 110 to consider uplink grants on the other carrier/serving cells. According to a possible implementation, the first PHR and the second PHR can be transmitted in a PHR MAC CE in the uplink transmission.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 6:
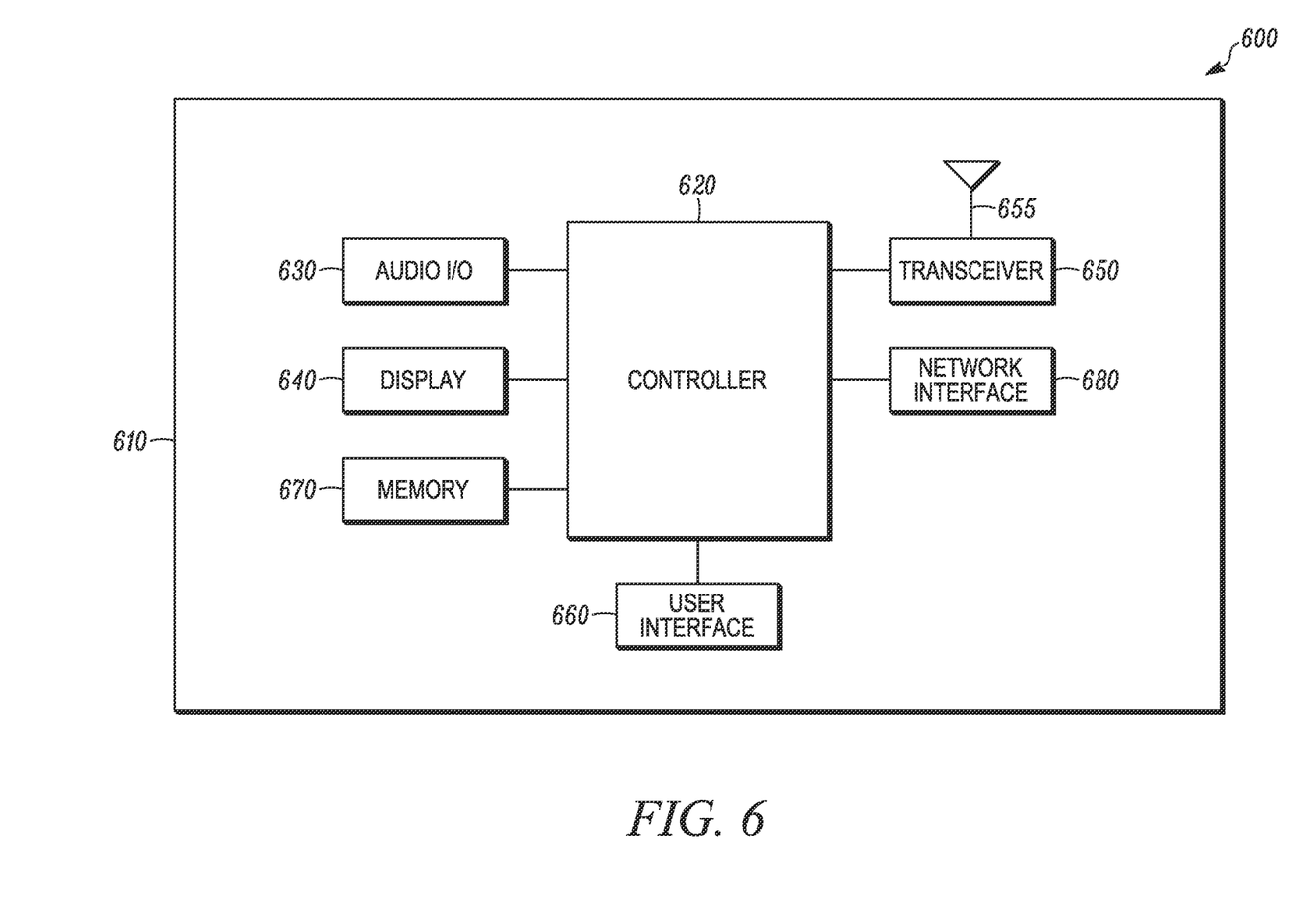
FIG. 6 is an example block diagram of an apparatus according to a possible embodiment.

FIG. 6 is an example block diagram of an apparatus 600, such as the UE 110, the base station 120, an access point, or any other device disclosed herein, according to a possible embodiment. The apparatus 600 can include a housing 610, a controller 620 within the housing 610, audio input and output circuitry 630 coupled to the controller 620, a display 640 coupled to the controller 620, at least one transceiver 650 coupled to the controller 620, an antenna 655 coupled to the transceiver 650, a user interface 660 coupled to the controller 620, a memory 670 coupled to the controller 620, and a network interface 680 coupled to the controller 620. The apparatus 600 can perform the methods described in all the embodiments.

The display 640 can be a viewfinder, a liquid crystal display (LCD), a light emitting diode (LED) display, a plasma display, a projection display, a touch screen, or any other device that displays information. The at least one transceiver 650 can include a transmitter, a receiver, multiple transceivers, and/or different transceivers for different frequencies and/or different wireless communication interfaces. The audio input and output circuitry 630 can include a microphone, a speaker, a transducer, or any other audio input and output circuitry. The user interface 660 can include a keypad, a keyboard, buttons, a touch pad, a joystick, a touch screen display, another additional display, or any other device useful for providing an interface between a user and an electronic device. The network interface 680 can be a Universal Serial Bus (USB) port, an Ethernet port, an infrared transmitter/receiver, an IEEE 1394 port, a Wireless Local Area Network (WLAN) transceiver, or any other interface that can connect an apparatus to a network, device, or computer and that can transmit and receive data communication signals. The memory 670 can include a random access memory, a read only memory, an optical memory, a solid state memory, a flash memory, a removable memory, a hard drive, a cache, or any other memory that can be coupled to an apparatus.

The apparatus 600 or the controller 620 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a NET® framework, or any other application framework. The software and/or the operating system may be stored in the memory 670 or elsewhere on the apparatus 600. The apparatus 600 or the controller 620 may also use hardware to implement disclosed operations. For example, the controller 620 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 620 may be any controller or processor device or devices capable of operating an apparatus and implementing the disclosed embodiments. Some or all of the additional elements of the apparatus 600 can also perform some or all of the operations of the disclosed embodiments.

In operation, the at least one transceiver 650 can communicate at least on a first component carrier having a first TTI and a second component carrier having a second TTI. The controller 620 can ascertain that a PHR has been triggered for at least one of the first component carrier, the second component carrier, and/or other component carriers. The transceiver 650 can receive an uplink grant corresponding to an uplink transmission on the first component carrier. The controller 620 can determine a first PHR reference TTI corresponding to the uplink transmission on the first component carrier. The controller 620 can generate a first PHR for the first component carrier based on the first PHR reference TTI.

The controller 620 can determine a second PHR reference TTI on the second component carrier. According to a possible implementation, the second PHR reference TTI can be the first overlapping TTI on the second component carrier where the first PHR reference TTI overlaps the second PHR reference TTI. According to another possible implementation, the second PHR reference TTI can be the first overlapping TTI on the second component carrier where one of the first PHR reference TTI and the second PHR reference TTI fully overlaps the other of the first PHR reference TTI and the second PHR reference TTI.

The controller 620 can generate a second PHR for the second component carrier based on the second PHR reference TTI. According to a possible implementation, the second PHR can be generated based on a predefined numerology when using a predefined uplink transmission for the calculation of the second PHR. According to another possible implementation, the second PHR can be generated only when the second TTI is same as the first TTI. The transceiver 650 can transmit the first PHR and the second PHR in the uplink transmission.

According to a possible embodiment, the uplink grant can be a first uplink grant and the uplink transmission can be a first uplink transmission. The controller 620 can determine an uplink grant TTI where a second uplink grant can be received. The second uplink grant can correspond to a second uplink transmission in the second PHR reference TTI on the second component carrier. The second uplink grant can grant the second uplink transmission in the second PHR reference TTI beginning at the same time as the first PHR reference TTI. The controller 620 can monitor for the second uplink grant in the uplink grant TTI. The controller 620 can generate the second PHR for the second component carrier for the second PHR reference TTI based on monitoring for the second uplink grant. The controller 620 can generate the second PHR for the second PHR reference TTI when the second uplink grant is received in the uplink grant TTI. The first uplink grant can be a first time period away from the first PHR reference TTI, the second uplink grant can be a second time period away from the second PHR reference TTI, and the transceiver 650 can transmit the PHR on the component carrier with the shortest time period between the corresponding uplink grant and the corresponding PHR reference TTI. According to a possible implementation, the controller 620 can generate the second PHR using a predefined uplink transmission for the second component carrier when the apparatus 600 is unable to determine whether there is an uplink transmission on the second component carrier. According to another possible implementation, the second PHR reference TTI can be an overlapping TTI where one of the first uplink transmission and the second uplink transmission fully overlaps the other of the first uplink transmission and the second uplink transmission.

It should be noted that throughout the present disclosure the term slot/TTI/subframe has been used to denote the unit for scheduling data transmission. Data transmissions can also be scheduled to span one or multiple slots.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of,'" "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method performed by a base station, the method comprising:
    receiving an uplink transmission in an allocated slot on a first serving cell of the base station,
        the allocated slot on the first serving cell overlapping with multiple slots on a second serving cell of the base station,
    receiving a first power headroom report for the allocated slot on the first serving cell;
    receiving a second power headroom report for the second serving cell,
        wherein the second power headroom report is for a first slot of the multiple overlapping slots on the second serving cell that fully overlaps with the allocated slot on the first serving cell; and
    receiving the first power headroom report and the second power headroom report in the uplink transmission in the allocated slot on the first serving cell,
    wherein the first power headroom report and the second power headroom report are Type 1 power headroom reports.

2. The method according to claim 1,
    wherein the base station is configured with
        a first serving cell for physical uplink shared channel transmissions having a first subcarrier spacing and a first slot length and
        a second serving cell for physical uplink shared channel transmissions having a second subcarrier spacing and a second slot length,
        the first subcarrier spacing being smaller than the second subcarrier spacing and the first slot length being larger than the second slot length, and
    wherein the method further comprises transmitting the uplink allocation corresponding to the allocated slot on the first serving cell, the allocated slot on the first serving cell overlapping with multiple slots on the second serving cell.

3. The method according to claim 1,
    wherein the multiple overlapping slots on the second serving cell comprise at least one slot that fully overlaps with the allocated slot on the first serving cell, and
    wherein the at least one slot that fully overlaps with the allocated slot starts with the first slot of the at least one slot that fully overlaps with the allocated slot.

4. The method according to claim 1, further comprising transmitting a first uplink grant including the uplink allocation, where the uplink transmission comprises a first uplink transmission.

5. The method according to claim 1,
    wherein the allocated slot on the first serving cell begins at a first time, and
    wherein the first slot of the multiple overlapping slots begins a second time, where the first time is before the second time.

6. The method according to claim 1, wherein receiving the first power headroom report and the second power headroom report is accomplished using a power headroom report medium access control (MAC) control element of the uplink transmission in the allocated slot on the first serving cell.

7. The method according to claim 1,
    wherein the first power headroom report indicates a difference between a user equipment configured maximum uplink transmit power of the first serving cell and an estimated power for an uplink shared channel transmission on the first serving cell, and wherein the second power headroom report indicates a difference between a user equipment configured maximum uplink transmit power of the second serving cell and an estimated power for an uplink shared channel transmission on the second serving cell.

8. An apparatus comprising:

a controller that controls operations of the apparatus;

a transceiver coupled to the controller, where the transceiver receives an uplink transmission in an allocated slot on a first serving cell of the apparatus, the allocated slot on the first serving cell overlapping with multiple slots on a second serving cell of the apparatus, receives a first power headroom report for the allocated slot on the first serving cell, receives a second power headroom report for the second serving cell, wherein the second power headroom report is for a first slot of the multiple overlapping slots on the second serving cell that fully overlaps with the allocated slot on the first serving cell, and receives the first power headroom report and the second power headroom report in the uplink transmission in the allocated slot on the first serving cell, wherein the first power headroom report and the second power headroom report are Type 1 power headroom reports.

9. The apparatus according to claim 8, wherein the apparatus is configured with a first serving cell for physical uplink shared channel transmissions having a first subcarrier spacing and a first slot length and a second serving cell for physical uplink shared channel transmissions having a second subcarrier spacing and a second slot length, the first subcarrier spacing being smaller than the second subcarrier spacing and the first slot length being larger than the second slot length, and wherein the transceiver transmits the uplink allocation corresponding to the allocated slot on the first serving cell, the allocated slot on the first serving cell overlapping with multiple slots on the second serving cell.

10. The apparatus according to claim 8, wherein the multiple overlapping slots on the second serving cell comprise at least one slot that fully overlaps with the allocated slot on the first serving cell, and wherein the at least one slot that fully overlaps with the allocated slot starts with the first slot of the at least one slot that fully overlaps with the allocated slot.

11. The apparatus according to claim 8, wherein the transceiver transmits a first uplink grant including the uplink allocation, where the uplink transmission comprises a first uplink transmission.

12. The apparatus according to claim 8, wherein the allocated slot on the first serving cell begins at a first time, and wherein the first slot of the multiple overlapping slots begins a second time, where the first time is before the second time.

13. The apparatus according to claim 8, wherein receiving the first power headroom report and the second power headroom report is accomplished using a power headroom report medium access control (MAC) control element of the uplink transmission in the allocated slot on the first serving cell.

14. The apparatus according to claim 8, wherein the first power headroom report indicates a difference between a user equipment configured maximum uplink transmit power of the first serving cell and an estimated power for an uplink shared channel transmission on the first serving cell, and wherein the second power headroom report indicates a difference between a user equipment configured maximum uplink transmit power of the second serving cell and an estimated power for an uplink shared channel transmission on the second serving cell.

\* \* \* \* \*